United States Patent [19]

Brooks et al.

[11] Patent Number: 4,895,380

[45] Date of Patent: Jan. 23, 1990

[54] ADJUSTABLE VARIABLE SLOPE ELEVATING CREEPER

[76] Inventors: Ben Brooks, 1600 East Dunnam, Hobbs, Lea County, N. Mex. 88241-2324; Frankie L. Brooks, 401 Springbrook Trail, Smyrna, Ga. 30080

[21] Appl. No.: 157,217

[22] Filed: Feb. 17, 1988

[51] Int. Cl.$^{4}$ .......................... B25H 5/00; B62B 11/00

[52] U.S. Cl. .................................................... 280/32.6

[58] Field of Search ........................................ 180/32.6

[56] References Cited

U.S. PATENT DOCUMENTS 2,054,598 9/1936 Goldenberg ........................ 280/32.6

2,520,047 8/1950 Moody et al. ...................... 280/32.6

2,703,717 3/1955 Miller ................................ 280/32.6

2,843,391 7/1958 Pelletier ............................ 280/32.6

FOREIGN PATENT DOCUMENTS 491962 4/1953 Canada .............................. 280/32.6

*Primary Examiner*—Kenneth R. Rice

*Attorney, Agent, or Firm*—Donald R. Andersen

[57] ABSTRACT

An improved adjustable variable slope elevating creeper including a mobile horizontal frame, a platform for supporting a reclining person, and a device for lifting one or both ends of the platform by a control operable by the reclining person.

15 Claims, 4 Drawing Sheets

ADJUSTABLE VARIABLE SLOPE ELEVATING CREEPER

BACKGROUND OF INVENTION

The present invention relates generally to automobile service equipment such as is used in a typical garage or vehicle service station. More specifically, it relates to a mechanic's creeper such as used by a mechanic to slide underneath an automotive vehicle, particularly a high ground clearance vehicle, in order to service or make repairs thereunder.

Conventional creepers generally include a rigid horizontal frame mounted on casters and having a platform for supporting a reclining mechanic. The conventional creeper slides easily underneath a vehicle facilitating access by the mechanic to the vehicle's underneath area for servicing and repair work. Some creepers include an adjustable headrest but these do not include support for the shoulders of the mechanic so the mechanic is easily fatigued and is not able to reach upward effectively and effortlessly.

Some creepers are adjustable to a sloping position but generally these must be adjusted by the mechanic prior to mounting or they require the mechanic to slide the creeper out from under the vehicle, dismount, make the adjustment, remount and slide back underneath the vehicle. If the correct adjustment has not been made, the mechanic is required to repeat the foregoing steps to again adjust the amount of slope. Not all of the parts beneath a car which must be serviced or repaired are at the same height from the ground, and it is awkward and time consuming to constantly make adjustments to the creeper.

In an apparently unrelated field, that of hospital equipment, adjustable height gurneys have been developed for use in transporting patients. These include a variety of elevating mechanisms, including both hydraulic and mechanical means. It is desirable that gurneys remain horizontal to prevent patients from inadvertently sliding from the gurney to the floor or ground. Thus, tilting mechanisms have not been developed in this field. Also, the means for raising and lowering the gurney are not only not designed for convenient use by the occupant of the gurney but are specifically designed to prevent operation by the occupant and to allow use exclusively by the hospital or other personnel working with the patient.

Generally, in the automotive industry, the ground-to-vehicle clearance is relatively small and standard tilting creepers are sufficient. However, with high ground clearance vehicles such as certain four wheel drive vehicles and many tractor trailer rigs, there is a need for an elevating creeper. Gurneys from the hospital field are unacceptable because they are not adjustable by the mechanic during use, are not generally capable of being tilted, and obviously are improperly proportioned for use by an automobile mechanic.

Finally, although it is generally desirable to perform repair and maintenance work on a vehicle which is on a level surface, occasionally a vehicle will become disabled on a sloped surface and a standard creeper is frequently ineffective in providing the necessary support for a mechanic to repair such vehicle.

SUMMARY OF INVENTION

It is an object of the present invention to provide an improved adjustable variable slope elevating creeper that is adjustable by a person reclining on the creeper.

It is a further object of the present invention to provide an improved adjustable variable slope elevating creeper that can be adjustable as to slope.

It is a further object of the present invention to provide an improved adjustable variable slope elevating creeper that can be raised and lowered.

It is a further object of the present invention to provide an improved adjustable variable slope elevating creeper that can be raised and lowered and adjusted as to slope.

It is a further object of the present invention to provide an improved adjustable variable slope elevating creeper that is simple in design.

It is a further object of the present invention to provide an improved adjustable variable slope elevating creeper that is inexpensive to manufacture.

It is a further object of the present invention to provide an improved adjustable variable slope elevating creeper that is rugged in construction.

It is a further object of the present invention to provide an improved adjustable variable slope elevating creeper that is easy to use and efficient in operation.

The foregoing objectives and still other objectives and advantages of the present invention will become apparent upon reading the following specification describing the preferred embodiments of the invention and also by reading the claims and referring to the following drawings in which the numbered parts of the embodiment described in the specification are shown by like numbered parts in the drawings.

DESCRIPTION OF THE DRAWINGS

FIG. 5C is a pictorial representation of a top view of the platform of said first preferred embodiment.

DESCRIPTION OF PREFERRED EMBODIMENTS

Figure 1:
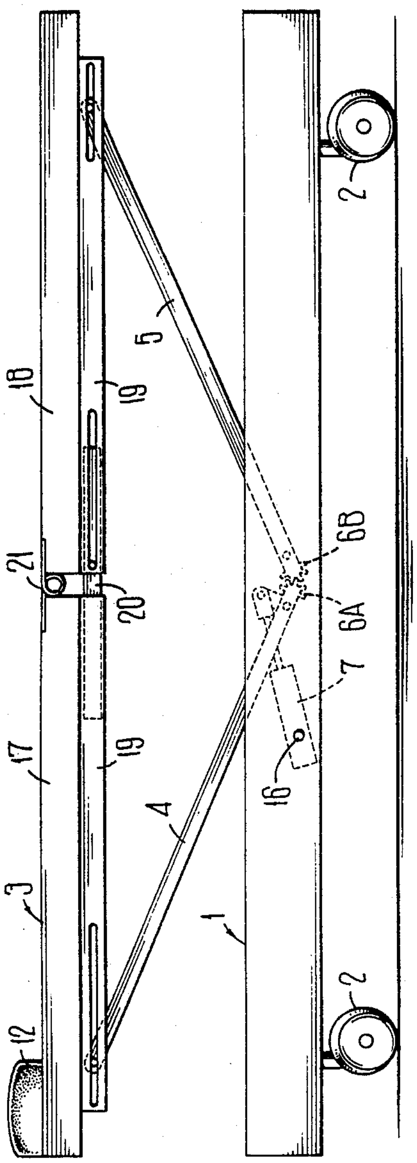
FIG. 1 is a pictorial representation of a side view of a first preferred embodiment with the platform in the horizontal position.

The following description sets forth preferred embodiments of the present invention. The following Description of Preferred Embodiments is not intended to be an exhaustive description of all of the alternative embodiments of the present invention, but is intended to disclose preferred embodiments of the invention. Accordingly, it will be understood that the scope of the present invention and the alternative embodiments encompassed thereby is limited only by the appended claims and not by the preferred embodiments set forth herein.

The preferred embodiments of the improved adjustable variable slope elevating creeper generally include a platform 3 of sufficient length and width to support a reclining person, supported by a plurality of lifter arms 4 and 5 above a mobile horizontal frame 1. One or more of the lifter arms 4 and 5 may be moveable and may be moved by action of a hydraulic jack 7. The hydraulic jack 7 is operated by a hydraulic jack handle 16 conveniently located for use by a person reclining on the platform 3. The user pumps the hydraulic jack handle 16 to increase hydraulic pressure in the hydraulic jack 7 causing the hydraulic jack 7 to push against and thereby lift one or more of the lifter arms 4. The user rotates the hydraulic jack handle 16 to release the pressure and lower the lifter arms 4. In another preferred embodiment, shown in FIG. 4B, the pressure is released by rotation of a knob 23 controlling a pressure release valve 24.

Referring now to FIG. 1, a first preferred embodiment of the present invention has at least a first and second lifter arm 4 and 5 having interlocking gear means 6A and 6B so that the action of the hydraulic jack 7 on the first lifter arm 4 causes the second lifter arm 5 to act in concert with the first lifter arm 4 to raise both ends of the platform 3 evenly, maintaining the horizontal orientation of the platform 3.

Figure 2:
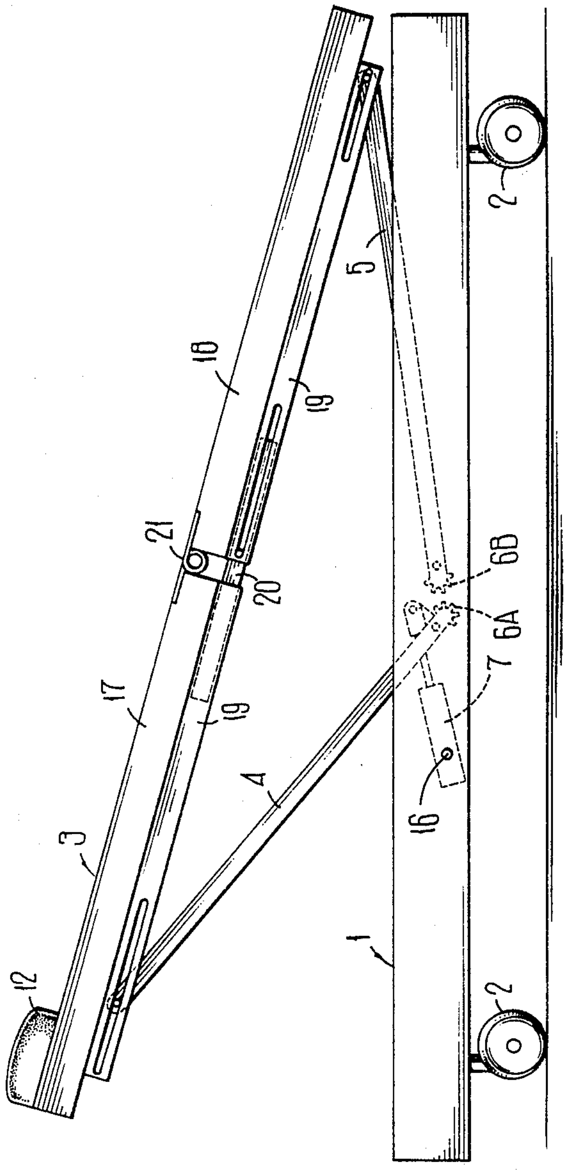
FIG. 2 is a pictorial representation of a side view of a first preferred embodiment with the platform in the sloping position.

Referring now to FIG. 2, in a second preferred embodiment of the present invention, the gear means 6A and 6B may be disengageable to permit the first lifter arm to lift one end of the platform 3 relative to the other end of the platform 3 to move the platform 3 into a sloping position.

Figure 3:
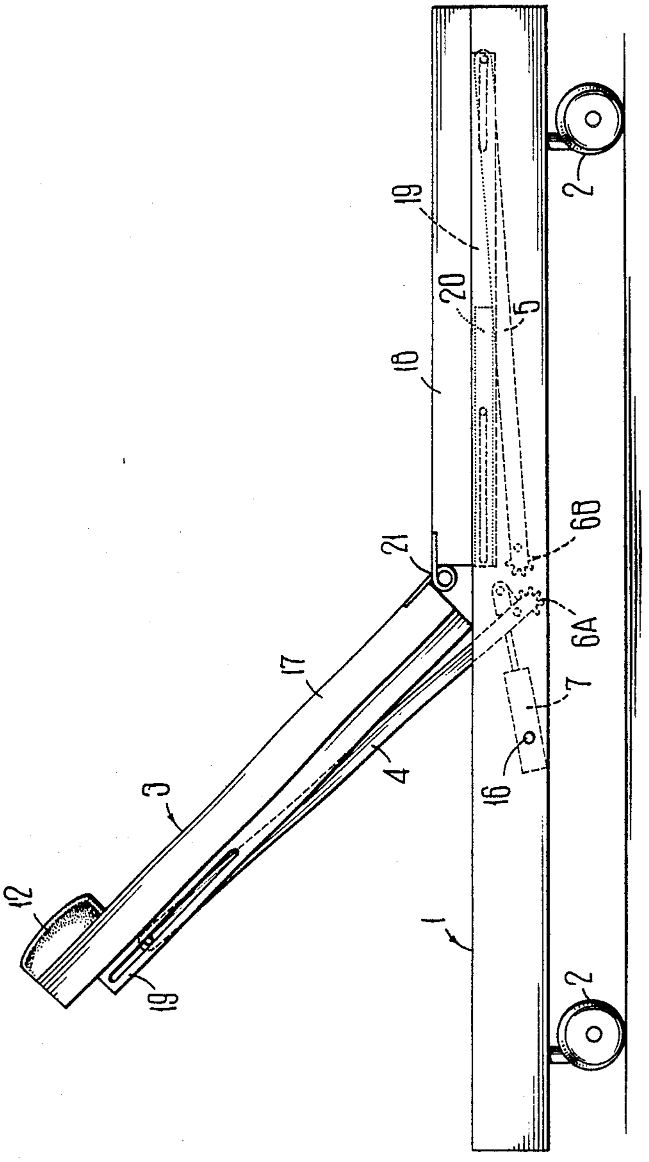
FIG. 3 is a pictorial representation of a side view of a first preferred embodiment with the platform in the chair position.

In a third preferred embodiment of the present invention, as illustrated in FIG. 3, the platform 3 consists of two sections having the ability to move independently of each other so that if the gear means 6A and 6B are disengaged the first lifter arm 4 will, upon action of the hydraulic jack 7, lift one end of the first section 17 relative to the other end of the first section 17 without affecting the horizontal orientation of the second section 18 of the platform 3, thus forming a chair type configuration.

In any of the preferred embodiments, the hydraulic jack 7 may be attached to the horizontal frame 1 and may be positioned to operate by pushing against either the first lifer arm 4 itself or against the portion of the gear means 6A attached to the lifter arm 4. It is preferable to have the hydraulic jack 7 operating on the gear means 6A and located outside the path of the lifter arm 4 to permit the platform 3 to be lowered to a position closer to the ground than is possible if the hydraulic jack 7 is located directly below the first lifter arm 4 and in its path.

Figure 5A:
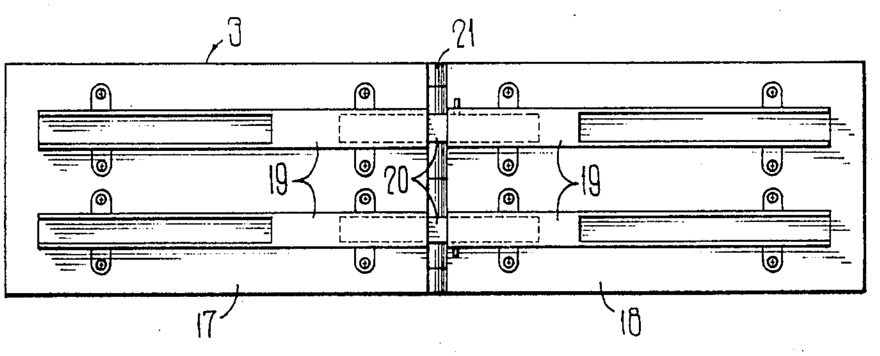
FIG. 5A is a pictorial representation of a bottom view of the platform of said first preferred embodiment illustrating the rigid support bars in the interlocking position.
Figure 5B:
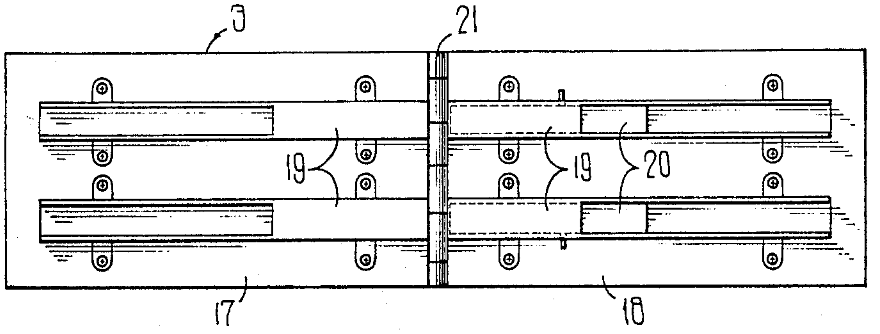
FIG. 5B is a pictorial representation of a bottom view of the platform of said first preferred embodiment illustrating the, rigid support bars in the non-interlocking position.
Figure 6:
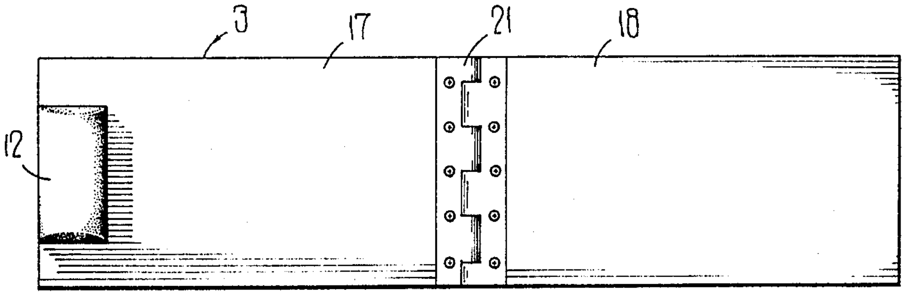

The platform 3 in the first preferred embodiment should be rigid. The platform 3 in the first preferred embodiment may be a continuous rigid structure or may consist of two or more sections 17 and 18 as shown in FIG. 6. If the platform 3 consists of two or more sections 17 and 18, such sections 17 and 18 should be capable of being firmly attached for rigidity when the gear means 6A and 6B are engaged for horizontal raising and lowering of the platform 3 as in FIG. 1, should remain firmly attached for use when the gear means is disengaged for use as illustrated in FIG. 2, and then should be separable and may be connected by hinge means 21 for use with the third preferred embodiment as illustrated in FIG. 3. One means of firmly attaching the two sections 17 and 18 would be to use a platform 3 having one or more hollow chambers in both sections 17 and 18 or in a plurality of support braces 19 supporting said sections, said hollow chambers being open to a central location between the sections 17 and 18 and being aligned to permit one or more rigid bars 20 to be moved by a user of the present invention by means of a conveniently located handle to be positioned in such a manner as to rest in part in a hollow chamber of each section 17 and 18 or in a hollow chamber of the support braces 19 for each of sections 17 and 18. The use of support braces 19 and interlocking rigid bars 20 to firmly attach sections 17 and 18 of platform 3 is illustrated in FIGS. 5A and 5B. Ideally, the rigid bars 20 could be locked into place by any convenient mechanical means but because of their intended horizontal position and anticipated lack of lateral stress on the rigid bars 20, it would not be expected that the bars would tend toward displacement other than by mechanical manipulation by the user. If rigid support bars 20 or other support means are not employed, the hinge means 21 connecting the two sections 17 and 18 would be under considerable stress and should be very sturdy.

The horizontal frame 1 may be of any design and should be capable of being moved along the ground. In each of the preferred embodiments, a plurality of sturdy casters 2 are ideally used to provide maximum moveability in the most economical manner.

Figure 4A:
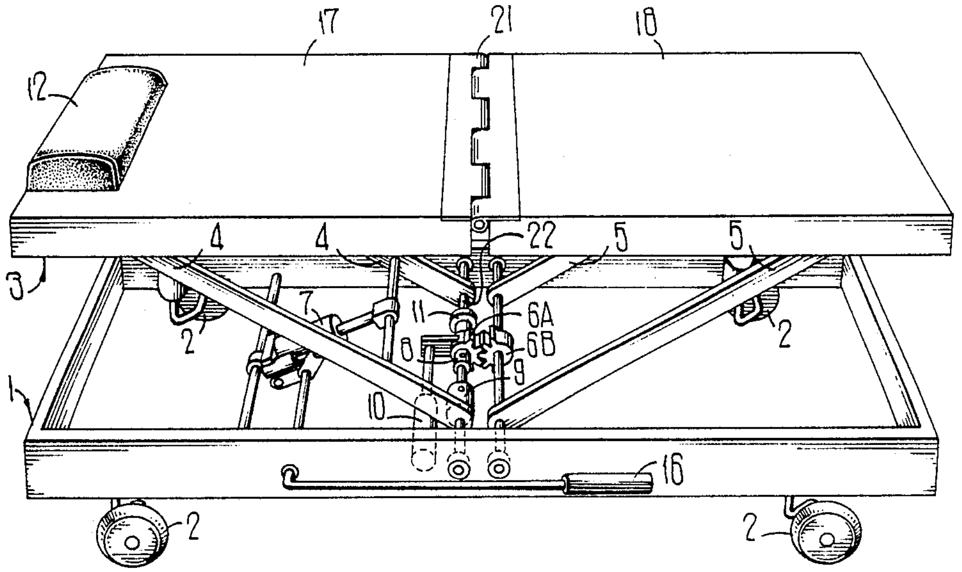
FIG. 4A is a perspective drawing of a second preferred embodiment, specifically showing in perspective view the gear mechanism for raising and lowering the platform 3.
Figure 4B:
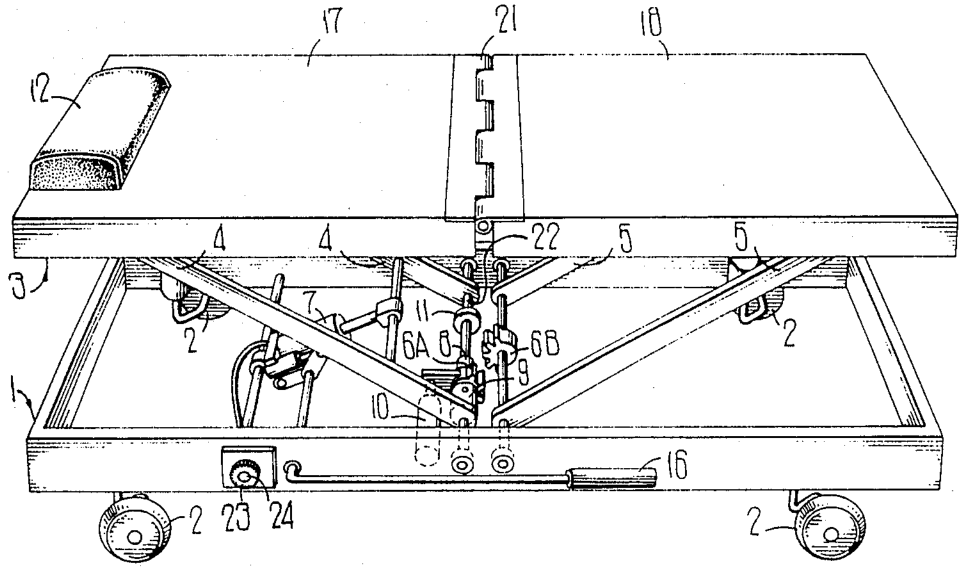
FIG. 4B is a pictorial representation specifically showing in perspective view the gear means connecting the lifter arms of said first and second preferred embodiment.

FIGS. 4A and 4B illustrate one means of providing disengageable gear means 6A and 6B. In this preferred embodiment, the gear means 6A interlocks with gear means 6B in the normal position as illustrated in FIG. 4A. In this embodiment, gear means 6A may be mounted on a moveable sleeve 8 on a horizontal lifter arm brace 22 reinforcing the lifter arm or arms 4 for the first section 17. A spring means such as a spring loaded shaft 10 may be positioned to push the moveable sleeve 8 along the horizontal lifter arm brace 22 until it is stopped by stop means 11 which may be a rigid stop bar 11 placed along the path of the moveable sleeve 8. The moveable sleeve 8 may be moved away from the stop bar 11 to disengage gear means 6A and 6B and it may be held in such disengaged position by a locking means 9.

In operation, the rigid support bars 20 and the disengageable gear means 6A and 6B may be preset by the user prior to reclining on the platform 3 of the present invention or may be set or reset by such user from the reclining position during use. Thus, a user may make initial settings, may then recline on the platform 3 and slide underneath the vehicle using hands or feet to push against the ground, may then raise or lower the platform 3 either horizontally as in FIG. 1 by operating the hydraulic jack 7, may cause the platform to slope in one continuous direction as in FIG. 2, or may cause the first section 17 alone to slope to form a chair configuration as in FIG. 3. The sloped position of FIG. 2 and chair position of FIG. 3 can be achieved at any height relative to the ground by first activating the raising or lowering of the platform 3 in its horizontal configuration and then disengaging the gear means 6A and 6B and operating the hydraulic jack 7 with the rigid support bars 20 in the interlocking position shown in FIG. 5A to form the sloped position of FIG. 2 or by disengaging the gear means 6A and 6B, moving the rigid support bars 20 to the non-interlocking position shown in FIG. 5B and then operating the hydraulic jack 7 to form the chair position of FIG. 3. Each of the maneuvers can be conveniently performed without requiring the user to remove the creeper from underneath the vehicle, to dismount, to adjust, to remount, and to move back underneath the vehicle.

A removable headrest 12 may be included in a convenient location at the end of the first section 17 located furthermost from the second section 18 in the case of the preferred embodiment having two or more sections or at the outside end of the single section platform 3 at the end raised by said first lifter arm or arms 4.

It will be understood by those skilled in the art that the foregoing Description of Preferred Embodiments has not been exhaustive of the various alternative embodiments of the present invention, and has been merely illustrative and exemplary of the preferred embodiments of the present invention. It will also be understood that additional embodiments fall within the spirit and scope of the present invention, and that the present invention is limited solely by reference to the appended claims.

I claim:

1. An improved adjustable variable slope elevating creeper comprising (a) a mobile horizontal frame, (b) a platform having sufficient length and rigidity to support a reclining person, said platform being supported above said horizontal frame at opposite ends by a first movable lifter arm and a second movable lifter arm, (c) means for raising said first lifter arm attached to said horizontal frame and linked to said first lifter arm and having the capacity to cause said lifter arm to raise and lower said platform upon operation of said means for raising said first lifter arm, (d) means for causing said second lifter arm to move in concert with said first lifter arm, and (e) means for operating said means for raising said first lifter arm positioned for convenient operation by said reclining person.

2. An improved adjustable variable slope elevating creeper as claimed in claim 1 wherein said means for raising said first lifter arm is a hydraulic jack.

3. An improved adjustable variable slope elevating creeper as claimed in claim 1, wherein said means for causing said second lifter arm to move in concert with said first lifter arm is a gear means.

4. An improved adjustable variable slope elevating creeper as claimed in claim 3 wherein said gear means is a sliding gear means capable of being engaged and disengaged.

5. An improved adjustable variable slope elevating creeper as claimed in claim 4, wherein said sliding gear is linked to a slideable spring loaded cylinder capable of maintaining said gear means in the engaged position.

6. An improved adjustable variable slope elevating creeper as claimed in claim 5 wherein said slideable spring loaded cylinder is responsive to means for disengaging said gear means and may be secured to allow said gear means to remain in the disengaged position.

7. An improved adjustable variable slope elevating creeper comprising (a) a mobile horizontal frame, (b) a platform suspended above said horizontal frame and having sufficient length and rigidity to support a reclining person and being comprised of a first section and a second section capable of moving either in concert or independently, and (c) means for independently elevating a first end of said platform relative to a second end of said platform, said means for independently elevating said first end being positioned for convenient operation by said reclining person.

8. An improved adjustable variable slope elevating creeper as claimed in claim 7 wherein said means for independently raising said first end of said platform is capable of raising one end of said first section relative to the other end of said first section without affecting the slope or horizontal orientation of said second section.

9. An improved adjustable variable slope elevating creeper as claimed in claim 8 wherein said first and second sections of said platform are aligned end to end such that the intersecting line of said sections is perpendicular to the direction of said reclining person and wherein said first and second sections are approximately equal in size.

10. An improved adjustable variable slope elevating creeper as claimed in claim 9 wherein said adjacent ends of said first and second sections are attached to one another by hinge means.

11. An improved adjustable variable slope elevating creeper as claimed in claim 9 wherein said platform is further supported by at least one support brace.

12. An improved adjustable variable slope elevating creeper as claimed in claim 9 wherein said first and second sections are further connected by interlocking means capable of connecting said first and second sections to form a rigid platform.

13. An improved adjustable variable slope elevating creeper as claimed in claim 12 said interlocking means comprises one or more slideable rigid support bars capable of being conveniently positioned by said reclining person.

14. An improved adjustable variable slope elevating creeper as claimed in claim 13 wherein said slideable rigid support bars may be positioned in one or more hollow chambers on each of said first and second sections.

15. An improved adjustable variable slope elevating creeper as claimed in claim 14 wherein said slideable rigid support bars may be secured in position.

* * * * *